3,020,496
SOLID DELAY LINES
Erwin Feuerstein, Needham, and Robert L. Sternberg, Marblehead, Mass., assignors to Laboratory For Electronics, Inc., Boston, Mass., a corporation of Delaware
Filed May 7, 1958, Ser. No. 733,650
14 Claims. (Cl. 333—30)

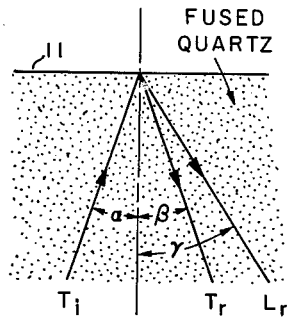
FIG. 1
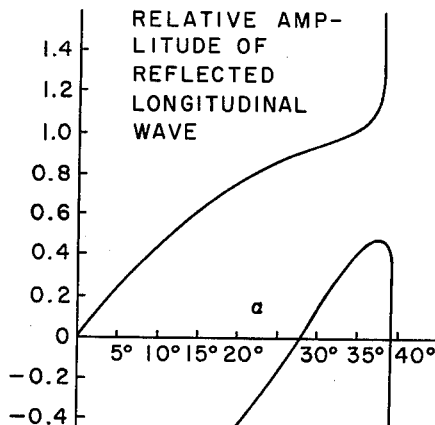
FIG. 2A
FIG. 2B
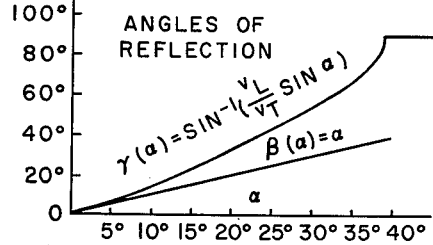
FIG. 2C
INVENTORS
ERWIN FEUERSTEIN
ROBERT L. STERNBERG
BY *Fred Jacob*
ATTORNEY

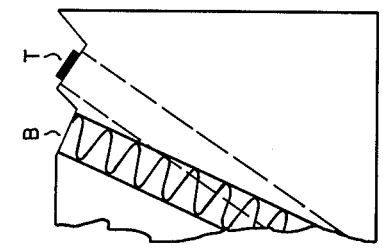
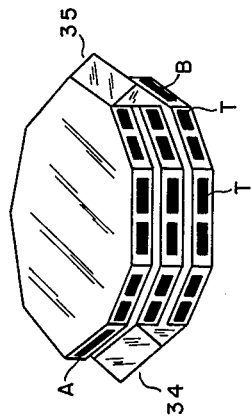
INVENTORS
ERWIN FEUERSTEIN
ROBERT L. STERNBERG
BY *Fred Jacob*
ATTORNEY

United States Patent Office 3,020,496
Patented Feb. 6, 1962

The present invention relates in general to new and improved solid delay lines for storing electrical signals in the form of ultrasonic energy, in particular delay lines having output taps for providing a number of different delay intervals.

Generally speaking, equipment available today which functions as a tapped ultrasonic delay line is complex, bulky and expensive both in initial cost and in maintenance. In one technique, a number of ordinary ultrasonic delay lines are connected in series with electronic equipment, the latter forming the connecting links and the output taps at which signals having different delay periods become available. In another technique, signals are recirculated around a single delay line, an identifying modulation being placed on each. The complexity of the equipment required is manifest as are its high cost and bulk. Attempts have been made, which have been largely unsuccessful, at providing a single solid folded delay line with taps intermediate the input and output transducers to obtain output signals having different delay intervals. These taps or transducers are placed on each of the reflecting facets of an ordinary multiple reflection delay line. In such a delay line the ultrasonic waves reflected sequentially from a plurality of internal reflecting surfaces define a reflection path. Since the angles of incidence and reflection are equal for a given mode of propagation, the angle of incidence, i.e. the angle between the incident waves and a normal to the reflecting surface, must be greater than zero in order that a reflection path may be obtained. Since, in the arrangement described, portions of the ultrasonic energy must be tapped off at the reflecting surfaces to obtain intermediately delayed output signals, tap transducers located at these surfaces will receive the ultrasonic waves at the angle of incidence. The incident wave front will not impinge at the transducer simultaneously throughout its width and a loss of bandwidth with poorly defined signal pulses results. Stated differently, in such an arrangement at any instant the phase along the transducer will be a linear function of the transverse coordinate. In general, the problem of combining the functions of a reflector and of an absorptive transducer on the same surface area have proved formidable and no satisfactory solution has been advanced heretofore.

Accordingly, it is an object of the present invention to provide self-contained, solid, ultrasonic delay lines having a predetermined total delay period and providing taps at which output signals are available at successively larger fractions of said total delay period.

It is another object of the invention to provide compact, light weight, solid ultrasonic delay lines embodying in a single unit the main delay channel and the fractional delay channels.

It is a further object of this invention to provide solid, ultrasonic tapped delay lines having output taps spaced in time along the delay line.

It is an additional object of the invention to provide solid delay lines employing transversely polarized elastic waves incident to the internal reflecting surfaces at a critical angle such that transverse and longitudinal waves are obtained upon reflection, and output transducers spaced in time along the delay line for converting the longitudinal waves split off at each reflecting surface into electrical signals.

These and other novel features of the invention together with further objects and advantages thereof will become apparent from the following detailed specification with reference to the accompanying drawings in which:

FIG. 1 illustrates the phenomenon of splitting ultrasonic waves;

FIGS. 2A, 2B and 2C graphically illustrate the splitting effect under various conditions;

FIG. 4 illustrates a modification of the embodiment of FIG. 3 wherein a number of polygonal slabs are stacked to increase the length of the delay line; and FIG. 5 illustrates another embodiment of the invention which utilizes the parallel left and right faces of a slab of the elastic medium.

Figure 3:
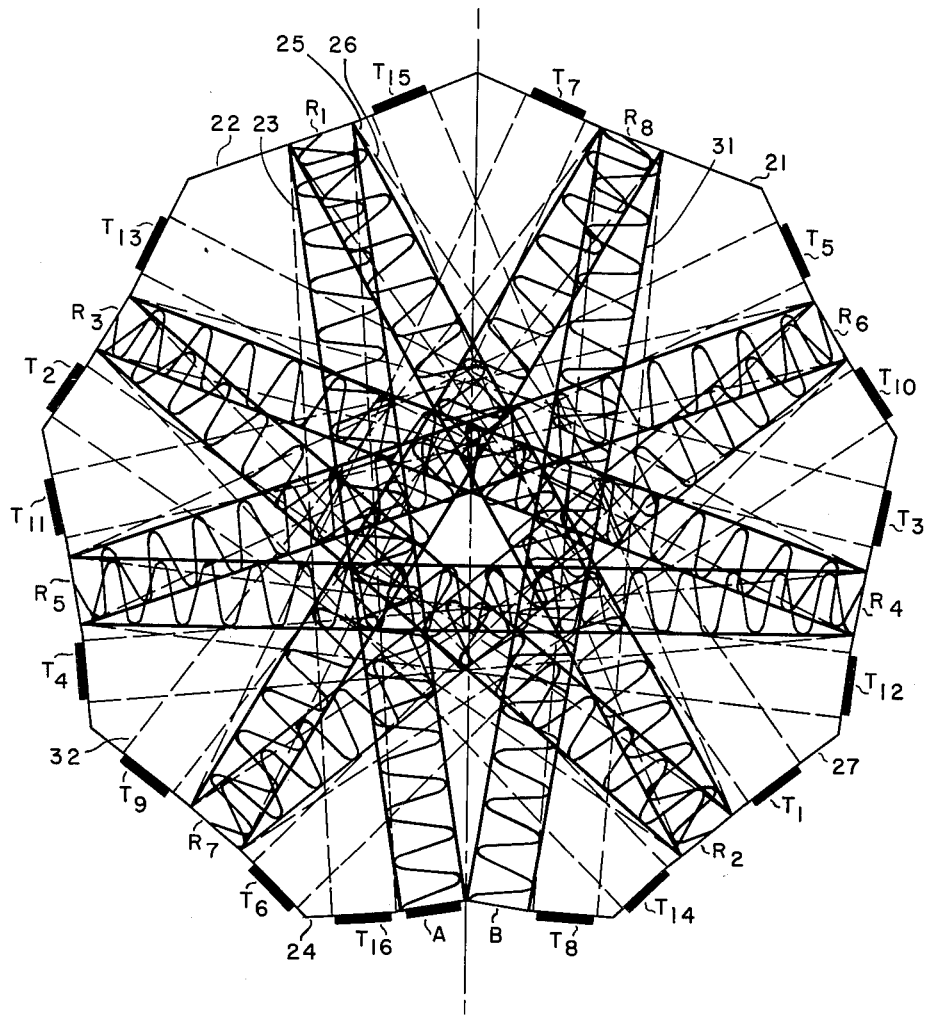
FIG. 3 illustrates one embodiment of the invention employing an elastic medium in the form of a polygonal slab.

With reference now to FIG. 1, the phenomenon of "splitting" utilized in the tapped delay line which forms the subject matter of the present invention causes incident transverse elastic waves to divide into two new waves at the reflecting area, $T_i$ denotes the transverse elastic waves polarized in the plane of the drawing which are incident on reflecting area 11 at an angle $\alpha$. As a result, transverse waves $T_r$ are reflected at an angle $\beta$ and longitudinal waves $L_r$ are reflected at an angle $\gamma$. Like $T_i$, the reflected transverse waves $T_r$ are also polarized in the plane of the drawing, i.e. their vibrations are substantially confined to planes parallel to the plane of the drawing. Their direction of propagation is indicated by vector $T_r$. Longitudinal waves $L_r$ comprise a series of compressions and rarefactions of the medium which propagate in the direction of the vector as shown. As indicated in FIG. 1, the velocity of propagation of the transverse waves $v_T$ differs from $v_L$, the velocity of propagation of the longitudinal wave. If $T_i$, $T_r$, and $L_r$ denote the amplitudes of these waves the following relationships apply:

$$\frac{L_r}{T_i} = \frac{4\,v_L v_T \cot \alpha\,(\cot^2 \alpha - 1)}{4 \cot \alpha (v_T^2 v_L^2 \csc^2 \alpha - v_L^4)^{1/2} + v_L^2(\cot^2 \alpha - 1)^2}.$$

$$\frac{T_r}{T_i} = \frac{4 \cot \alpha (v_T^2 v_L^2 \csc^2 \alpha - v_L^4)^{1/2} - v_L^2(\cot^2 \alpha - 1)^2}{4 \cot \alpha (v_T^2 v_L^2 \csc^2 \alpha - v_L^4)^{1/2} + v_L^2(\cot^2 \alpha - 1)^2},$$

$$\beta(\alpha) = \alpha,\ \gamma(\alpha) = \sin^{-1}\left(\frac{v_L}{v_T} \sin \alpha\right).$$

These relations are valid for $$\alpha < \sin^{-1} \frac{v_T}{v_L}$$

while for larger angles of incidence the reflected longitudinal waves develop into boundary waves and the reflected transverse waves become equal in amplitude to the incident transverse waves but shifted in phase 180°. It will be noted that angle $\alpha$ equalled angle $\beta$ throughout the critical range for which these relations are valid.

FIGS. 2A, 2B and 2C illustrate in graphical form the relationships noted above as a function of angle $\alpha$, FIG. 2A showing the amplitude of the reflected longitudinal wave relative to the incident wave, FIG. 2B showing the amplitude of the reflected transverse wave relative to the incident wave and FIG. 2C illustrating angle $\gamma$.

FIG. 3 illustrates one embodiment of the invention wherein the elastic medium employed has the form of a thin, polygonal slab 21 having parallel top and bottom surfaces. An electrical signal applied at input transducer A is converted into transverse elastic waves, polarized in the plane of the drawing as indicated schematically by solid parallel lines bordering a sine wave. The material of the propagation medium, e.g. fused quartz, is chosen so as to be internally reflective to ultrasonic waves. Accordingly, the transverse wave originating at input transducer A will be reflected at planar reflecting area $R_1$ contained in side surface 22 of the polygonal slab, which is located substantially opposite from the input transducer. The angle of input transducer A relative to planar area $R_1$ is such that the angle of incidence of transverse waves 23 lies within the critical range noted for angle $\alpha$ hereinabove. Upon reflection, transverse waves 23 will accordingly be split into transverse waves 25, reflected off planar area $R_1$ at an angle equal to the angle of incidence, and into longitudinal waves 26 whose angle of reflection, although different from that of waves 25, also depends upon the angle of incidence of waves 23. The longitudinal waves are indicated schematically by broken lines and, as previously noted, they consist of successive compressions and rarefactions of the medium. The waves propagated in the medium are highly directional in character, in the nature of a beam. In the instant embodiment, the beam is rectangular in cross section, all wave fronts in the beam being parallel. The angle of the incident transverse wave beam on a reflecting area must be chosen to obtain sufficient difference in the angles of reflection of the reflected transverse and longitudinal wave beams respectively, so that no overlap or interference exists upon incidence of the latter on the opposite surface of the medium. Tap transducer $T_1$ located on surface 27 substantially opposite from reflecting area $R_1$, is adapted to convert the incident longitudinal waves 26 into electrical signals. Surface 27 is so shaped that tap transducer $T_1$ is positioned at right angles to the incident longitudinal waves. In order to obtain optimum band width, and hence well-defined electrical pulse signals at the tap output, it is important that the waves, having a substantially rectangular cross-section, impinge on the tap transducer simultaneously along their entire front. Spurious reflections can be held to a minimum by the use of a suitable receiving crystal with an image-matched tap transducer. Transverse waves 25 impinge on planar reflecting area $R_2$ at the same angle of incidence as that of waves 23. Accordingly, the phenomenon of "splitting" will again occur, transverse waves being reflected to reflecting area $R_3$, while longitudinal waves are reflected in the direction of tap transducer $T_2$ and are converted into electrical signals there. The process of internal reflection continues at internal reflecting area $R_3$, $R_4$ . . . $R_8$, longitudinal waves split off at each of these reflecting areas being received at tap transducers $T_3$, $T_4$ . . . $T_8$.

If desired, an output transducer, which will convert the incident transverse waves into electrical signals, may be placed at B. Alternatively, the length of the delay line may be doubled by providing an internal reflecting surface at right angles at B, or other reflecting means which will reflect the transverse waves back to reflecting area $R_8$ and cause them to retrace the reflection path. Since the new angle of incidence of transverse waves 31 lies within the aforementioned critical range, wave splitting will again occur at reflecting area $R_8$. The longitudinal waves so created are detected by transducer $T_9$ and are converted into electrical signals. The process continues with the transverse waves retracing their reflection path to $R_7$, $R_6$ . . . $R_1$, while longitudinal waves are picked off and converted into electrical signals at $T_{10}$, $T_{11}$ . . . $T_{16}$. Input transducer A is absorptive to the remaining transverse wave energy reflected from $R_1$ and this prevents renewed reflections. This absorption may be accomplished by image matching transducer A.

Thus, either an 8-tap or 16-tap ultrasonic delay line is possible with the embodiment shown, the geometry of the configuration being such that the taps are equally spaced in time. In the 16-tap delay line an inequality in time occurs due to the necessity of the transverse wave for traversing the distance $R_8$–B twice. This condition may be corrected by moving reflector B close enough to $R_8$ so that the total distance covered is equal to that normally encountered between reflecting surfaces. The latter may be accomplished, for example, by enclosing an impurity which will cause reflections at the proper distance from $R_8$. This would necessitate a modification of the existing design. Depending on the time delays desired, other modifications are possible by shaping the medium in a manner such that the path between reflecting surfaces, or between a reflection surface and a tap transducer, is altered from that prescribed by the regular geometrical configuration.

With the exception of surfaces 22 and 24, the side surfaces are shown to have three distinct areas, each at a different angle in accordance with the function it is designed to carry out. Thus, the planar internal reflecting area R must have the proper angle relative to the incident transverse beam, while the transducers must be positioned at right angles to respective incident longitudinal waves. Numerous ways of shaping the surfaces to accomplish this are possible, e.g. by making special provisions for the tap transducers, the art being replete with examples.

FIG. 4 illustrates a modification of the embodiment of FIG. 3 wherein three polygonal slabs of a medium suitable for ultrasonic wave propagation have been stacked upon each other in order to lengthen the total delay time obtainable and to obtain additional output taps for providing different delay intervals. The construction follows closely that of the solid delay line first described in Patent No. 2,781,494 to T. J. Geoghegan, classified in Class 333—30. Suitable 45° reflecting facets 34 and 35 connect successively stacked polygonal slabs in order to join the minor reflection paths within respective delay lines into a continuous major reflection path extending from input transducer A to output transducer B. It is important that each reflecting facet assume the proper angle relative to the first reflecting surface of the minor reflection path in the appropriate slab to determine the proper angle of incidence on said first reflecting surface. As in the case of the embodiment of FIG. 3, two tap transducers for converting longitudinal waves into electrical signals are provided on each polygonal side surface, the second transducer on each surface being used only when a reflecting surface is substituted for the output transducer. It will be obvious that any number of slabs may be stacked, such stacking being limited only by the available amount of energy in the transverse wave.

The principles incorporated in the embodiments of FIGS. 3 and 4 may be combined in a medium suitable for the propagation of ultrasonic energy which has the form of a solid polyhedron. A transverse wave reflection path similar to that shown in FIG. 3 can be traced out in such a medium, the sole difference being that neither the path nor the resulting longitudinal waves are confined to a single plane. As in the case of FIG. 3, each surface of the solid polyhedron must provide a planar internal reflecting area for the transverse waves together with tap transducers for converting the incident longitudinal waves into electrical signals.

A further embodiment of the invention is illustrated in FIG. 5 wherein two parallel faces of a solid slab of the medium are utilized as the internal reflecting areas, the transverse waves being polarized in a plane parallel to said faces. Wherever possible, applicable reference characters have been carried forward. The principle employed herein is the same as that in the embodiment of FIG. 3, the angle of input transducer A relative to the parallel faces being important to determine the angle of incidence of transverse waves 23 at reflecting area $R_1$. As before, B may be a reflecting surface to cause the transverse waves to retrace their reflection path for the purpose of lengthening the obtainable delay period and to obtain the additional output taps made possible thereby, or alternatively B may comprise an output transducer for converting the transversely polarized waves into electrical signals. All transducers are arranged at right angles to their corresponding waves. In contradistinction to the embodiments of FIGS. 3 and 4, the length of this delay line is not determined by the number of polygonal side surfaces.

By the method of splitting a transversely polarized elastic wave in the manner described, various embodiments of a solid ultrasonic delay line having output taps spaced in time along the delay line have been provided, while simultaneously using the multiple reflection geometry of suitably shaped fused quartz media, as is the case in ordinary solid delay lines. As a result, a compact, self-contained tapped delay line is obtained without the addition of complex associated electronic equipment. Interference between output taps has been largely obviated by separating out the energy to be tapped as a longitudinal wave from the main stream of transverse wave ultrasonic energy. As such, it can be absorbed effectively at the output taps by suitable receiving crystals and associated image-matched transducers. Since each receiving crystal is used only as an absorber of energy and not as a partial reflector of energy, spurious signals have largely been eliminated. Additionally, the use of the receiving crystal as an absorber only, permits its positioning at right angles to the incident longitudinal waves. As a result, the incident wave front impinges on the crystal simultaneously along its entire width and a sharper signal response coupled with greater band width is obtained. Finally, since many of the problems associated with quartz delay lines have their origin in the electro-acoustic transducers, it is important to note that the tapped delay lines which form the subject matter of the present invention require only one conversion cycle of electric energy into acoustic energy and back again for each delay path in the line. Thus, multiple conversion cycles, as would be required in a series of lines, or when using electronic recycling of the signal through a single line, are avoided.

Having thus described the invention, it will be apparent that numerous modifications and departures, as explained above, may now be made by those skilled in the art, all of which fall within the scope contemplated by the invention. Consequently, the invention herein disclosed is to be construed as limited only by the spirit and scope of the appended claims.

What is claimed is:

1. A solid delay line comprising a medium for propagating ultrasonic energy, an input transducer for converting an electrical signal into transversely polarized elastic waves propagated into said medium along a path defined by a plurality of planar, internal reflecting areas, each of said reflecting areas being positioned at an angle to said path, the magnitude of said angle lying within a predetermined critical range such that a portion of said transversely polarized waves incident on the respective reflecting areas are split therefrom into longitudinal waves reflected at different angles from said transversely polarized waves, and a plurality of tap transducers each receiving and converting a respective one of said longitudinal waves into an electrical signal.

2. The apparatus of claim 1 wherein said tap transducers are spaced along said delay line transmission path at equal distances from the reflecting areas from which said respective longitudinal waves are derived.

3. The apparatus of claim 1 wherein said internal reflecting areas are completely contained within two parallel planes, said transmission path alternating between respective areas in each of said planes.

4. The apparatus of claim 3 wherein the cross sectional areas of said transversely polarized waves and said longitudinal waves are substantially rectangular having a large width-to-height ratio, respective center lines through successive rectangular cross sections of each of said waves lying substantially in the same plane, the angle of incidence of said transversely polarized waves relative to each reflecting area which lies in either one of said two parallel planes being chosen to prevent overlap of said transversely polarized waves and the resultant longitudinal waves upon incidence on the other one of said parallel planes.

5. The apparatus of claim 1 wherein the planes containing respective internal reflecting areas are angularly disposed relative to each other.

6. The apparatus of claim 5 wherein said angle of incidence of transversely polarized waves relative to each reflecting area is arranged to prevent overlap of the resultant longitudinal waves with said transversely polarized waves upon incidence of the latter on the subsequent reflecting area of said reflection path.

7. The apparatus of claim 6 wherein the cross sectional areas of said transversely polarized waves and longitudinal waves are substantially rectangular having a large width-to-height ratio, respective center lines through successive rectangular cross sections of each of said waves lying substantially in the same plane.

8. A solid delay line comprising a medium for propagating ultrasonic energy, an input transducer for converting electrical signals into transversely polarized elastic waves, a folded reflective transmission path for said transversely polarized waves emanating from said input transducer defined by a plurality of planar, internal reflecting areas, each of said reflecting areas being positioned at an incidence angle to said path of said transversely polarized waves, said angle having a magnitude lying within a predetermined critical range such that a portion of the incident transversely polarized waves is split off upon reflection into first longitudinal waves propagated at different angles of reflection from said transversely polarized waves, a first plurality of non-reflective tap transducers for converting said longitudinal waves into electrical signals, a terminating planar reflecting area in said reflection path of said transversely polarized waves, said last recited area being angularly disposed relative to the incident transversely polarized waves so as to cause the latter to retrace said reflective transmission path, the incidence angle of said retracing transversely polarized waves relative to respective reflecting areas having a magnitude which lies within said predetermined critical range, a portion of said last recited waves being split off upon each reflection into second longtudinal waves, said second longitudinal waves being propagated in a direction different from that of said first longitudinal waves, a second plurality of non-reflective tap transducers for converting said second longitudinal waves into electrical signals, said input transducer being completely absorptive to the incident retracted transversely polarized wave.

9. A solid delay line comprising a medium for propagating ultrasonic energy, an input transducer for converting electrical signals into transversely polarized elastic waves, an output transducer for converting said transversely polarized waves emanating from said input transducer into electrical signals, a reflective transmission path for said transversely polarized waves defined by a plurality of planar, internal reflecting areas intermediate said input and output transducers, each of said reflecting areas being positioned at an incidence angle to the path of said transversely polarized waves, said angle having a magnitude which lies within a predetermined critical range such that a portion of said transversely polarized waves are split off upon each reflection into longitudinal waves propagated at different angles of reflection than said transversely polarized waves, and a plurality of non-reflective tap transducers for converting said longitudinal waves into electrical signals.

10. A solid, ultrasonic delay line comprising a fused quartz propagating medium in the shape of a relatively thin, polygonal slab having parallel top and bottom surfaces, an input transducer for converting electrical input signals into transversely polarized elastic waves propagated into said medium, said input transducer being absorptive to transversely polarized waves received in a direction opposite to the direction of propagation into said medium, the side surfaces of said medium being internally reflective to transversely polarized waves incident thereon, said surfaces sequentially defining a reflection path and being disposed in a predetermined angular relationship to each other, said input transducer being positioned relative to the first surface of said sequence to determine an angle of incidence of said transversely polarized waves at each of said reflecting surfaces having a magnitude which lies within a predetermined critical range, said incident transversely polarized waves giving rise upon reflection to longitudinal waves reflected at an angle and propagated at a velocity different from that of the reflected transversely polarized waves, said angle of incidence being arranged to prevent interference of the longitudinal waves resulting at each reflecting surface with said transversely polarized waves upon incidence of the latter on the subsequent reflecting surface of said sequence, internal reflecting means disposed at right angles to said transversely polarized waves reflected from the last reflecting surface of said sequence to cause said transversely polarized waves to retrace said sequence, and tap transducers for converting the longitudinal waves into electrical signals, said tap transducers being located on said delay line in the path of said resulting longitudinal waves and arranged to absorb completely the incident longitudinal waves, said tap transducers being spaced along said delay line to provide paths of equal length for said longitudinal waves.

11. A solid ultrasonic delay line comprising a fused quartz propagating medium in the shape of a solid polyhedron, an input transducer for converting electrical input signals into transversely polarized elastic waves propagated into said medium, said input transducer being absorptive to transversely polarized waves received in a direction opposite to the direction of propagation into said medium, the surfaces of said medium being internally reflective to transversely polarized waves incident thereon, said surfaces sequentially defining a reflective transmission path and being angularly disposed in a predetermined relationship to each other, said input transducer being positioned relative to the first surface of said sequence to determine an incidence angle of said transversely polarized waves at each of said reflecting surfaces having a magnitude which lies within a predetermined critical range, said incident transversely polarized waves giving rise upon reflection to longitudinal waves reflected at an angle and propagated at a velocity different from that of the reflected transversely polarized waves, said angle of incidence being chosen to prevent interference of the longitudinal waves resulting at each reflecting surface with the resultant transversely polarized waves upon incidence of the latter on the subsequent reflecting surface of said sequence, internal reflecting means disposed at right angles to said transversely polarized waves derived from the last reflecting surface of said sequence to cause said transversely polarized waves to retrace said sequence, a plurality of tap transducers corresponding in number to the number of reflecting surfaces giving rise to longitudinal waves, said tap transducers being adapted to convert longitudinal waves into electrical signals, said tap transducers being spaced along said delay line to having only longitudinal waves incident thereon provide paths of equal length for said longitudinal waves.

12. A solid ultrasonic delay line comprising a fused quartz propagating medium having parallel top and bottom surfaces, an input transducer for converting electrical input signals into transversely polarized elastic waves propagated into said medium, said input transducer being absorptive to transversely polarized waves received in a direction opposite to the direction of propagation into said medium, said top and bottom surfaces being internally reflective to transversely polarized waves incident thereon, discrete reflecting areas alternately located on said top and bottom surfaces to define a reflective transmission path, said input transducer being positioned relative to said surfaces to determine an incidence angle for said transversely polarized waves having a magnitude which lies within a predetermined critical range, said incident transversely polarized waves giving rise upon reflection to longitudinal waves reflected at an angle and propagated at a velocity different from that of the reflected transversely polarized waves, said angle of incidence at each surface being arranged to prevent interference of the reflected transversely polarized and longitudinal waves respectively upon incidence on the opposite surface of said medium, internal reflecting means disposed at right angles to the transverse waves reflected from the last reflecting area of said sequence to cause said transversely polarized waves to retrace said reflection path, a plurality of tap transducers corresponding in number to the number of reflecting surfaces given rise to longitudinal waves, said tap transducers being adapted to convert longitudinal waves into electrical signals, said tap transducers being spaced along respective top and bottom surfaces to provide paths of equal length for said longitudinal waves.

13. An ultrasonic delay line comprising a fused quartz propagating medium in the form of a plurality of relatively thin polygonal slabs stacked upon each other, each of said slabs having parallel top and bottom surfaces, an input transducer for converting electrical input signals into transversely polarized elastic waves propagated into the first slab of said delay line, an output transducer for converting incident transversely polarized waves derived from the last slab of said delay line into electrical signals, the side surfaces of each of said slabs being internally reflective to transversely polarized waves incident thereon, said surfaces sequentially defining minor reflection paths in each slab and being disposed in a predetermined angular relationship to each other, reflecting facets connecting adjacently stacked slabs to link successive minor reflection paths into a continuous, major, transversely polarized wave reflection path intermediate said input and output transducers, said input transducer having a predetermined angular position relative to the first minor reflection path surface of said first slab, said last recited relative angular position being identical to that of said reflecting facets and the first minor reflection path surface of their corresponding slabs, said angular positions determining an angle of incidence of said transversely polarized waves at each of said reflecting surfaces having a magnitude which lies within a predetermined critical range, said incident transversely polarized waves giving rise upon reflection to longitudinal waves reflected at an angle and propagated at a velocity different from that of the reflected transversely polarized waves, said angle of incidence being arranged to prevent interference of the longitudinal waves resulting at each surface with said transversely polarized waves upon incidence of the latter on the subsequent reflecting surface of a minor reflection path, a plurality of tap transducers corresponding in number to the number of reflecting surfaces giving rise to longitudinal waves, said tap transducers being adapted to convert longitudinal waves into electrical signals, said tap transducers being spaced along the sequence of surfaces of adjacently stacked slabs of said delay line to provide paths of equal length for said longitudinal waves.

14. A delay line comprising: a solid medium for propagating elastic wave energy, the medium having wave reflecting surfaces defining an internal propagation path for transverse elastic waves, each reflecting surface being arranged at an angle to the propagation path, the angle of each reflecting surface being within a critical range such that the energy in transverse waves propagating along said path and incident on the reflecting surface is upon reflection emanated as a train of transverse waves and a train of longitudinal waves divergent from the transverse wave train; tap transducer means arranged to remove the energy in the longitudinal waves; additional transducer means for deriving energy from said reflected train of transverse waves; and elastic wave energy input means for introducing transverse elastic wave energy into said path.

References Cited in the file of this patent

UNITED STATES PATENTS

| | | |
|---|---|---|
| 2,592,135 | Firestone | Apr. 8, 1952 |
| 2,672,590 | McSkimin | Mar. 16, 1954 |
| 2,777,997 | Arenberg et al. | Jan. 15, 1957 |
| 2,781,494 | Geoghegan | Feb. 12, 1957 |

OTHER REFERENCES

Arenberg: "Ultrasonic Solid Delay Lines," The Journal of the Acoustical Society of America, vol. 20, No. 1 January 1948, pages 1–26.

UNITED STATES PATENT OFFICE
CERTIFICATE OF CORRECTION

Patent No. 3,020,496                  February 6, 1962

Erwin Feuerstein et al.

It is hereby certified that error appears in the above numbered patent requiring correction and that the said Letters Patent should read as corrected below.

Column 2, line 29, for "area," read -- area. --; column 3, line 60, for "area" read -- areas --; column 7, line 72, for "having" read -- have --.

Signed and sealed this 19th day of June 1962.

(SEAL)
Attest:

ERNEST W. SWIDER                   DAVID L. LADD
Attesting Officer                   Commissioner of Patents